United States Patent [19]

Kuwajima

[11] Patent Number: 4,645,596
[45] Date of Patent: Feb. 24, 1987

[54] FILTER APPARATUS

[75] Inventor: Soichi Kuwajima, Urawa, Japan

[73] Assignee: Nihon Schumacher Kabushiki Kaisha, Tokyo, Japan

[21] Appl. No.: 769,425

[22] Filed: Aug. 26, 1985

[51] Int. Cl.⁴ .................. B01D 29/32; B01D 25/10
[52] U.S. Cl. ......................... 210/193; 210/287; 210/315; 210/346; 210/452; 210/455; 210/486; 210/506; 210/510.1
[58] Field of Search ............ 210/323.2, 331, 346, 210/486, 510.1, 193, 264, 287, 340, 341, 302, 303, 451, 452, 455, 506, 315

[56] References Cited

U.S. PATENT DOCUMENTS

| | | | |
|---|---|---|---|
| 2,521,060 | 9/1950 | Hallinan | 210/452 |
| 3,402,818 | 9/1968 | Sasaki | 210/323.2 |
| 3,436,898 | 4/1969 | Kaess et al. | 210/323.2 |
| 3,503,516 | 3/1970 | Harms et al. | 210/323.2 |
| 3,524,548 | 8/1970 | McDonald et al. | 210/510.1 |
| 3,875,055 | 4/1975 | Grosboll et al. | 210/287 |
| 4,052,317 | 10/1977 | Palnik | 210/323.2 |
| 4,105,562 | 8/1978 | Kaplan et al. | 210/323.2 |
| 4,336,043 | 6/1982 | Aonuma et al. | 210/323.2 |
| 4,451,369 | 5/1984 | Sekino et al. | 210/323.2 |
| 4,522,717 | 6/1985 | Brust | 210/340 |

Primary Examiner—Richard V. Fisher
Assistant Examiner—Wanda L. Millard
Attorney, Agent, or Firm—Martin Smolowitz

[57] ABSTRACT

The filter apparatus has a plurality of filter cylinders each formed of a plurality of filter elements and a blind cylinder is provided between a support plate for supporting the filter cylinders and the uppermost filter element of each filter cylinder, in order to prevent a liquid to be filtered from passing a region of each filter cylinder where the surface of the liquid is moved vertically.

5 Claims, 4 Drawing Figures

FILTER APPARATUS

BACKGROUND OF THE INVENTION

The present invention relates to a filter apparatus for improving filtration accuracy and preventing porous filter elements from being clogged with foreign matter, dirt and grime.

In general, some kinds of filter apparatuses are widely used in processes for manufacturing sugar, beer and the like. As one of them, there has been used a type of filter apparatus which has a plurality of filter cylinders supported, at their upper ends, by a support plate in a filter tank. Each filter cylinder has a plurality of filter elements connected to each other in series.

In the above conventional filter apparatus, liquid to be filtered is fed into the tank under pressure from an inlet of the tank, and the liquid is filtered by the filter cylinders. Then its filtrate is discharged from an outlet of the tank. Before the liquid to be filtered is processed through the filter cylinders of the filter, in general, liquid such as water for dissolving diatomaceous earth is passed through the filter cylinders for a specific period of time, so that a desirable thickness of the diatomaceous earth is drifted around the filter elements of each of the filter cylinders. Thereafter, the liquid to be filtered is passed through the filter cylinders so as to be filtered by the diatomaceous earth around the filter elements.

However, at the upper end of each filter cylinder, there may exist a region where the diatomaceous earth is not drifted properly around the filter cylinder. That is, the surface of a liquid to be filtered does not necessarily reach the upper end of each filter cylinder and an upper region of each filter cylinder immediately below the support plate for supporting each filter cylinder is often exposed to air because the surface of the liquid to be filtered is raised and lowered due to the change of feeding pressure of a pump.

At a region of each cylinder, which contacts the surface of the liquid, a pre-coated diatomaceous earth layer is apt to be broken by a rippling phenomenon. Accordingly, if the surface of the liquid to be filtered is moved vertically, the pre-coated diatomaceous earth layer around the region of the cylinder, corresponding to a distance through which the liquid surface is moved vertically, is broken.

If the level of the liquid to be filtered is raised after once the level of the liquid is lowered, the liquid to be filtered passes through the region of the filter cylinder where the pre-coated diatomaceous earth is broken. Accordingly, as the liquid passes through the filter cylinder without being filtered, the filtration efficiency of each filter cylinder decreases. Furthermore, the upper part of each porous filter cylinder may be clogged with fine particles of foreign matter, dirt, grime and the like.

SUMMARY OF THE INVENTION

It is an object of this invention to prevent liquid to be filtered from passing a portion of each filter cylinder around which no diatomaceous earth drifts thereby to improve filtration efficiency and prevent the filter cylinder from being clogged.

According to the present invention, there is provided a filter apparatus comprising: a filter tank; a plurality of filter cylinders supported vertically by a support plate for partitioning the filter tank into two spaces, in one of which space a liquid to be filtered is fed and through the other of which space a filtrate is discharged outwardly, each filter cylinder having a plurality of porous filter elements for filtering the liquid below the support plate; and blind means with a predetermined length, disposed under the support plate on each filter cylinder so that the liquid to be filtered is prevented from passing through an upper region of the filter cylinder, close to the support plate.

DETAILED DESCRIPTION OF THE INVENTION

Figure 1:
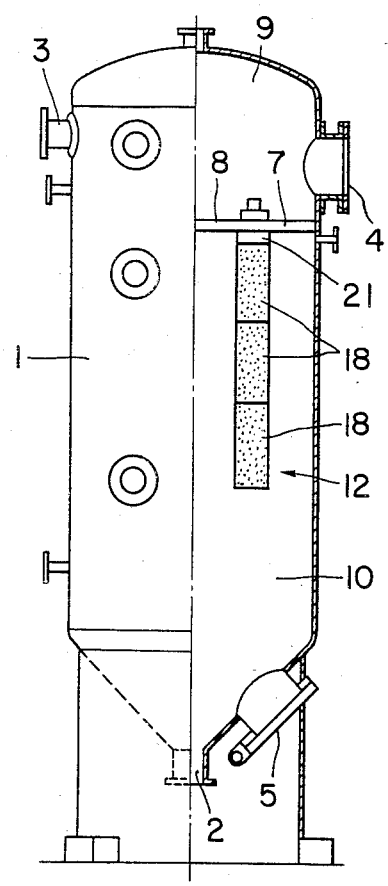
FIG. 1 is a side elevational view, partly in longitudinal section and partly schematic, of a filter apparatus according to the present invention.

Referring first to FIG. 1, a tank 1 has an inlet 2 for liquid to be filtered at its lower end and an outlet 3 for filtrate at its upper part. The tank 1 further has manholes 4 and 5 through which an operator checks the inside of the tank 1. The tank 1 is divided into two spaces 9, 10, that is, an upper space 9 and a lower space 10, by a partition plate or support plate 7 coated with lining 8.

Figure 2:
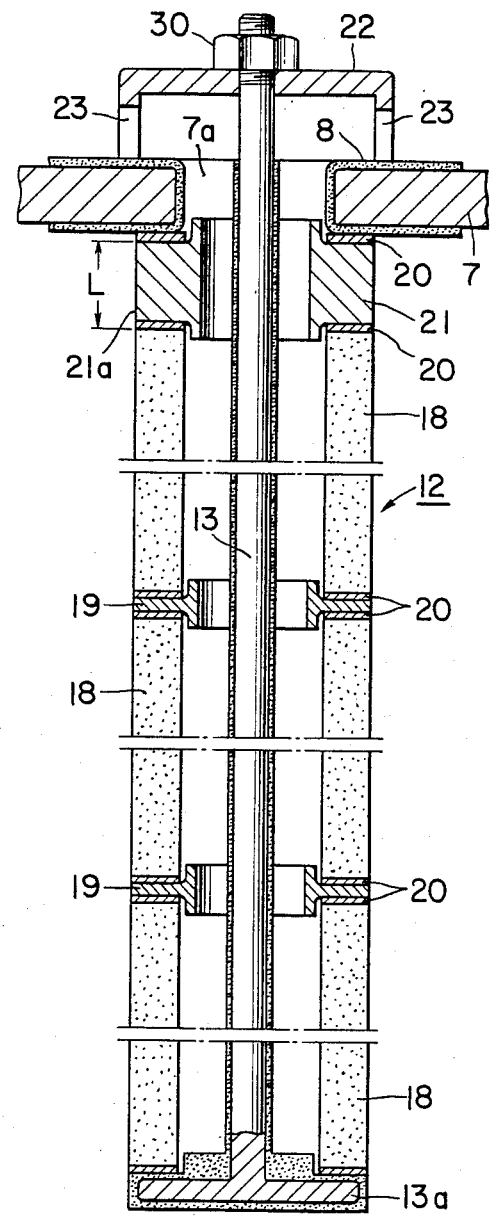
FIG. 2 is a longitudinal sectional view of a filter cylinder according to the present invention.

A plurality of filter cylinders 12 are supported, at their upper ends, by the support plate 7 (only one cylinder 12 is shown in FIG. 1). FIG. 2 shows the vertical sectional view of the filter cylinder 12. As shown in FIG. 2, the filter cylinder 12 comprises a plurality of filter elements 18 made of porous ceramic material or the like and connected vertically to each other in series.

A spindle 13 is inserted into each filter cylinder 12 with a guide plate 19 interposed between two adjoining filter elements. The spindle 13 has a support flange 13a for supporting the lower surface of the lowermost filter element 18. The upper end portion of the spindle 13 is extended vertically through a hole 7a formed in the support plate 7 and its distal upper end is supported by a cup-like support member 22 through a screw threaded nut 30. The support member 22 has a plurality of openings 23 disposed in the side wall thereof for permitting the filtrate to pass therethrough.

Between the guide plate 19 and the end face of each filter element 18 and between the flange 13a of the spindle 13 and the end face of the lowermost filter element are provided a plurality of gaskets 20 for preventing leakage of the liquid to be filtered.

Furthermore, between the support plate 7 and the uppermost filter element 18 is provided a blind cylinder 21 located between two gaskets 20, 20. The blind cylinder 21 has a cylindrical blind wall 21a with a predetermined length L, which is longer than a distance through which the surface of the liquid to be filtered is raised and lowered in a normal filtering condition.

Figure 3:
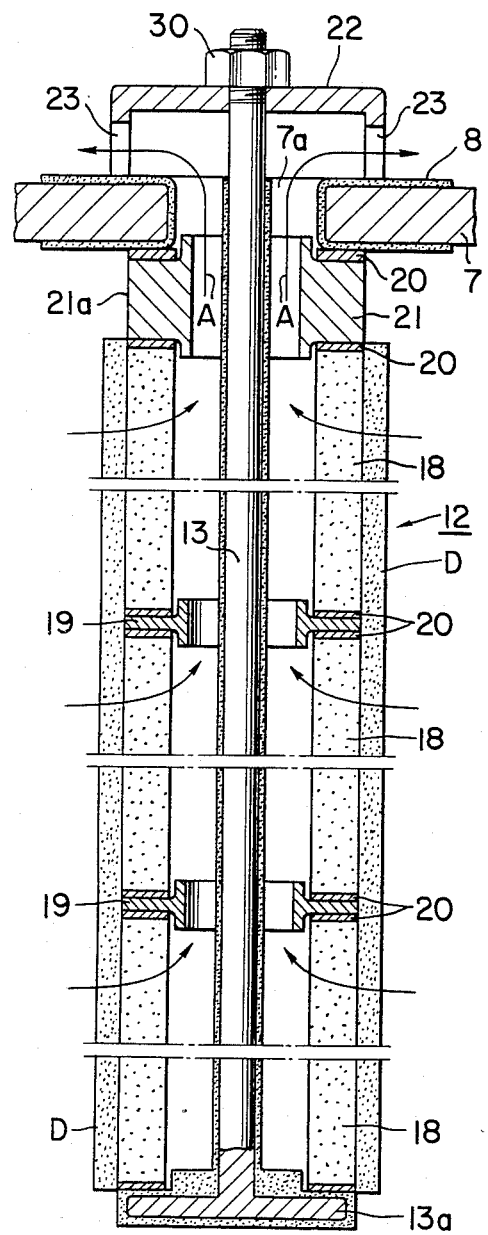
FIG. 3 is a longitudinal sectional view of a filter cylinder around which diatomaceous earth drifts.

The filtration by the use of this invention, structured as described, with reference to FIG. 3 above now will be described. First, before a liquid is filtered through the filter cylinders 12 of the filter apparatus, liquid such as water for dissolving diatomaceous earth is passed through the filter elements 18 of each filter cylinder 12 for a specific period of time so that a desirable thickness of the diatomaceous earth D is drifted around each filter cylinder 12 except each blind cylinder 21, as shown by FIG. 3.

Thereafter, the liquid to be filtered is fed into lower space 10 of the tank 1 under pressure from the inlet 2 of the tank 1, and the liquid to be filtered is passed through the filter cylinder 12 so as to be filtered by the diatomaceous earth around the filter elements 18. Then, a filtrate which has passed through the filter elements 18 flows in the direction of arrows A as shown in FIG. 3 and passes through the hole 7a of the support plate 7 and the openings 23 of the support member 22.

The filtrate is then discharged from the outlet 3 of the tank 1.

In the apparatus of this invention, as the blind cylinder 21 is provided at the upper portion of the filter cylinder 12 instead of a filter element 18, the liquid to be filtered cannot pass through a region of the filter cylinder 12 immediately below the support plate 7. Further, since in a normal filtering operation, the distance through which the surface of the liquid is moved vertically is shorter than the length L of the blind cylinder 21, the uppermost filter element 18 is not exposed to air. Accordingly, the liquid to be filtered always passes the portion of the cylinder 12 having a pre-coated diatomaceous earth therearound, thereby to prevent every element 18 from being clogged with fine particles of foreign matter, dirt, grime and the like.

Moreover, in the present filter apparatus, an air pressure layer can be formed in a region corresponding to the blind cylinder 21. The air pressure layer functions to press the surface of the liquid to be filtered thereby to prevent the surface from rippling. Accordingly, a stable flow of the liquid to be filtered can be ensured even near the blind cylinder 21.

Figure 4:
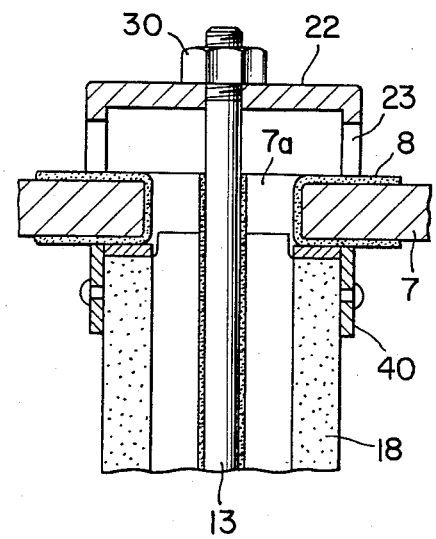
FIG. 4 is a side view of the upper part of the filter cylinder according to another embodiment of this invention.

In this invention, the blind cylinder 21 is disposed between the uppermost filter element 18 and the support plate 7. However, instead of the blind cylinder 21, an upper region, close to the support plate 7, of the filter cylinder may be covered with a cover plate 40, as shown in FIG. 4.

What is claimed is:

1. A filter apparatus for filtering liquids, comprising:
    a filter tank;
    a plurality of filter cylinders supported vertically by a support plate for partitioning the filter tank into two spaces, in one said space a liquid to be filtered is fed and through the other said space a filtrate is discharged outwardly, each filter cylinder having a plurality of porous filter elements around which diatomaceous earth is drifted for filtering the liquids below the support plate;
    a spindle inserted into each filter cylinder for supporting the filter cylinder on the support plate, said spindle having a flange at its lower end for supporting the lowermost filter element;
    a support member with at least one opening for permitting filtrate to pass therethrough and disposed so as to cover a hole formed in the support plate, the upper end of the spindle passing through the hole being supported by the support member; and
    blind means having a predetermined length longer than a distance through which the surface of the liquid is moved vertically during a normal filter operation disposed under the support plate on each filter cylinder, so that the liquid to be filtered is prevented from passing through an upper region of the filter cylinder close to the support plate of the filter cylinder.

2. A filter apparatus according to claim 1, wherein each filter element is made of ceramic.

3. A filter apparatus according to claim 1, wherein the blind means is formed of a non-porous cylinder.

4. A filter apparatus according to claim 1, wherein said blind means comprises a blind cylinder covering the upper part of the filter cylinders.

5. A filter apparatus for filtering liquid, comprising:
    a filter tank;
    a plurality of filter cylinders supported vertically by a support plate for partitioning the filter tank into two spaces, in one said space a liquid to be filtered is fed and through the other said space a filtrate is discharged outwardly, each filter cylinder having a plurality of porous filter elements around which diatomaceous earth is drifted for filtering the liquid below a support plate, said filter elements being made of a ceramic material;
    a spindle inserted into each filter cylinder for supporting the filter cylinder on the support plate, said spindle having a flange at its lower end for supporting the lowermost filter elements;
    a support member with at least one opening for permitting filtrate to pass therethrough and disposed so as to cover a hole formed in the support plate, the upper end of the spindle passing through the hole being supported by the support member; and
    blind means being formed of a non-porous cylinder and having a predetermined length longer than a distance through which the surface of the liquid is moved vertically during a normal filter operation disposed under the support plate on each filter cylinder, so that the liquid to be filtered is prevented from passing through an upper region of the filter cylinder close to the support plate of the filter cylinder.

* * * * *